(12) United States Patent
Davidian et al.

(10) Patent No.: US 10,202,778 B2
(45) Date of Patent: Feb. 12, 2019

(54) DRYWALL REPAIR KIT AND METHOD

(71) Applicant: TTI (MACAO COMMERCIAL OFFSHORE) LIMITED, Macau (MO)

(72) Inventors: Richard M. Davidian, Pickens, SC (US); Lauren Spratte, Decatur, GA (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 8 days.

(21) Appl. No.: 15/787,831

(22) Filed: Oct. 19, 2017

(65) Prior Publication Data

US 2018/0051476 A1    Feb. 22, 2018

Related U.S. Application Data

(62) Division of application No. 15/071,351, filed on Mar. 16, 2016.

(60) Provisional application No. 62/256,379, filed on Nov. 17, 2015, provisional application No. 62/133,795, filed on Mar. 16, 2015.

(51) Int. Cl.
    *E04G 23/02*    (2006.01)
    *B23B 51/04*    (2006.01)

(52) U.S. Cl.
    CPC ...... *E04G 23/0207* (2013.01); *B23B 51/0426* (2013.01); *B23B 2226/57* (2013.01); *B23B 2251/60* (2013.01)

(58) Field of Classification Search
    CPC ............ E04G 23/0207; B23B 51/0426; B23B 2226/57; B23B 2251/60
    USPC ...... 52/514, 514.5, 704; 408/204, 207, 1 BD
    See application file for complete search history.

(56) References Cited

U.S. PATENT DOCUMENTS

| | | | | |
|---|---|---|---|---|
| 2,794,469 | A | * 6/1957 | Shortell | B23B 51/0426 408/206 |
| 4,016,696 | A | * 4/1977 | Mess | E04G 17/0644 29/278 |
| 4,674,255 | A | * 6/1987 | Derome | E04G 17/0644 249/210 |
| 4,894,971 | A | 1/1990 | Cortese | |
| 5,052,333 | A | * 10/1991 | Woudsma | A47B 97/00 118/100 |
| 5,074,722 | A | * 12/1991 | Cochran | B23B 51/0426 408/204 |

(Continued)

FOREIGN PATENT DOCUMENTS

| GB | 2342877 | 4/2000 |
|---|---|---|
| GB | 2364662 | 2/2002 |

(Continued)

OTHER PUBLICATIONS

European Search Report for Application No. 16160557 dated Jul. 28, 2016 (1 page).

*Primary Examiner* — Joshua K Ihezie
(74) *Attorney, Agent, or Firm* — Michael Best & Friedrich LLP

(57) ABSTRACT

A method to repair a damaged area of a workpiece with a repair kit includes rotating an arbor to drive a cutting member about a central axis of the arbor, cutting a hole in the workpiece with the cutting member, engaging the workpiece with the cutting member as the hole is cut to secure the cutting member within the hole, disconnecting the arbor from the cutting member, and leaving the cutting member in the workpiece to plug the hole.

16 Claims, 9 Drawing Sheets

(56) References Cited

U.S. PATENT DOCUMENTS

| | | | |
|---|---|---|---|
| 5,076,741 A * | 12/1991 | Littlehorn | B23B 51/0453 408/204 |
| 5,353,568 A * | 10/1994 | Silva | E04G 23/0203 52/514 |
| 5,401,125 A | 3/1995 | Sevack et al. | |
| 5,692,864 A * | 12/1997 | Powell | F16B 13/002 411/30 |
| 5,743,682 A * | 4/1998 | Chaney, Sr. | B23B 51/0426 408/204 |
| 5,791,837 A * | 8/1998 | Johnson | B23B 51/0453 408/204 |
| 5,871,310 A * | 2/1999 | Mortensen | B23B 49/02 408/1 R |
| 6,023,901 A * | 2/2000 | Jensen | E04G 23/0203 408/72 R |
| 6,247,283 B1 * | 6/2001 | Slabaugh | E04F 21/02 52/514 |
| 6,305,885 B1 * | 10/2001 | Linthicum | B23B 51/0426 408/1 R |
| 6,893,194 B2 * | 5/2005 | Jones | B23B 51/0426 408/1 R |
| 6,935,084 B1 | 8/2005 | Larsen | |
| 7,189,036 B1 * | 3/2007 | Watson | B23B 51/0413 408/204 |
| 7,540,122 B2 * | 6/2009 | Trudeau | B23D 71/02 52/514 |
| 7,637,703 B2 * | 12/2009 | Khangar | B23B 51/0433 408/204 |
| 7,938,600 B1 * | 5/2011 | Griep | B23B 51/044 408/1 R |
| 8,573,907 B2 * | 11/2013 | Kalomeris | B23B 51/0406 408/204 |
| 2002/0094246 A1 | 7/2002 | Jones et al. | |
| 2002/0149127 A1 | 10/2002 | Prior | |
| 2003/0192637 A1 | 10/2003 | Cortese | |
| 2004/0096291 A1 * | 5/2004 | Reiter | F16B 13/002 411/178 |
| 2006/0002784 A1 * | 1/2006 | Curtis | F16B 33/004 411/371.1 |
| 2006/0010817 A1 | 1/2006 | Shull | |
| 2007/0006548 A1 | 1/2007 | Trudeau | |
| 2008/0149360 A1 | 6/2008 | Dinh et al. | |
| 2008/0181738 A1 * | 7/2008 | Capriotti | B23B 51/0426 408/207 |
| 2009/0035082 A1 * | 2/2009 | Singh | B23B 51/0453 408/204 |
| 2010/0067995 A1 * | 3/2010 | Keightley | B23B 51/0426 408/68 |
| 2011/0170968 A1 * | 7/2011 | Moffatt | B23B 51/0473 408/204 |
| 2011/0262235 A1 | 10/2011 | Garfield et al. | |
| 2012/0183366 A1 * | 7/2012 | Stenman | B23Q 11/0071 408/1 BD |
| 2012/0237306 A1 * | 9/2012 | Naughton | B23B 51/0426 408/82 |
| 2013/0209187 A1 * | 8/2013 | Bell | B23B 51/0426 408/115 R |
| 2014/0260046 A1 | 9/2014 | Baynham | |
| 2015/0016910 A1 * | 1/2015 | Korb | B23B 51/0406 408/204 |
| 2015/0190889 A1 * | 7/2015 | Hobbs | B23P 6/00 29/402.11 |

FOREIGN PATENT DOCUMENTS

| | | |
|---|---|---|
| JP | H07251311 | 10/1995 |
| WO | 2004011179 | 2/2004 |
| WO | 2005084859 | 9/2005 |
| WO | 2007035338 | 3/2007 |
| WO | 2015019349 | 2/2015 |

* cited by examiner

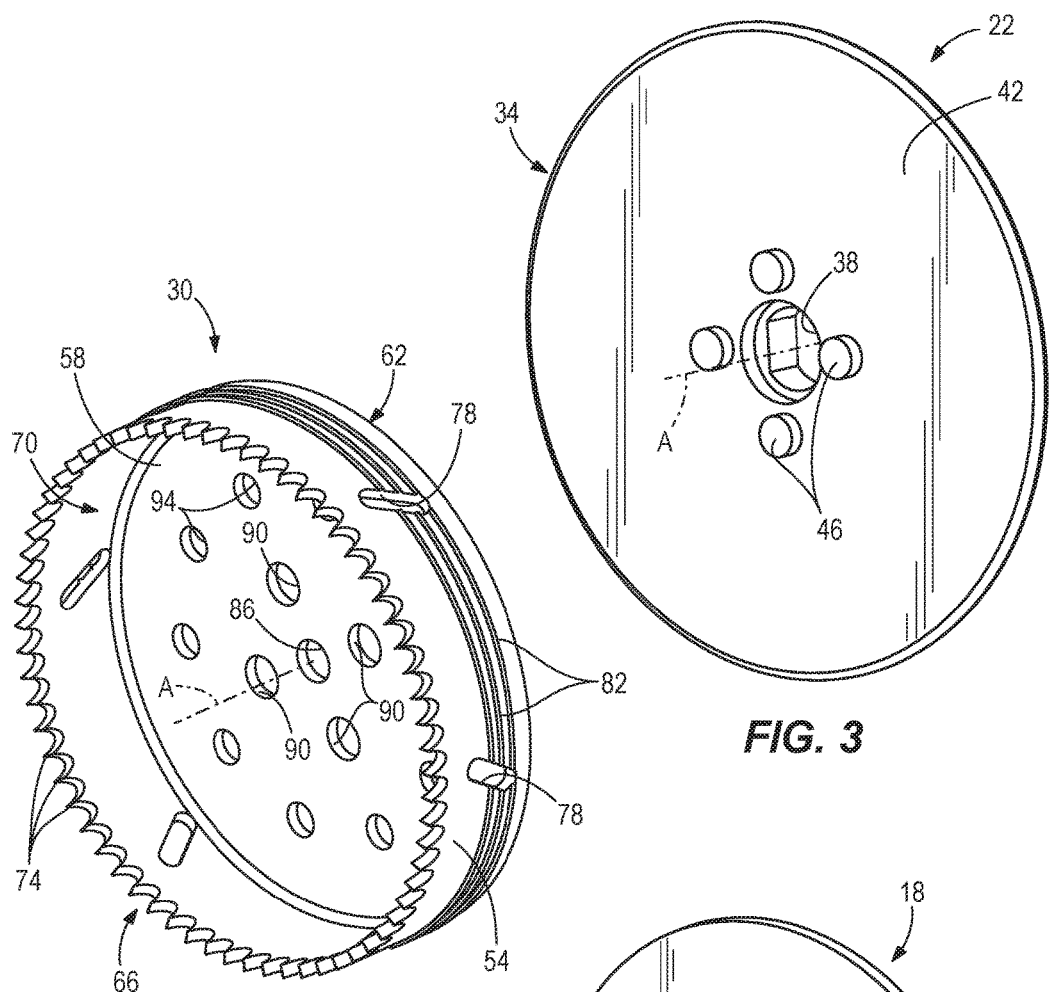
FIG. 3
FIG. 4
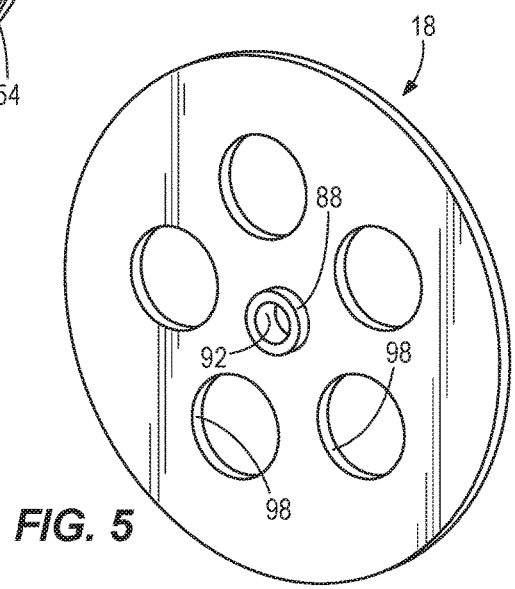
FIG. 5

DRYWALL REPAIR KIT AND METHOD

CROSS-REFERENCE TO RELATED APPLICATIONS

This application is a divisional of U.S. patent application Ser. No. 15/071,351, filed on Mar. 16, 2016, which claims priority to U.S. Provisional Patent Application No. 62/133,795, filed on Mar. 16, 2015, and to U.S. Provisional Patent Application No. 62/256,379, filed on Nov. 17, 2015, the entire contents of all of which are incorporated by reference herein.

FIELD OF INVENTION

The present invention relates to drywall repair kits and, more particularly, to drywall repair kits including hole saws.

BACKGROUND

Hole saws are typically used to cut large holes in drywall, wood, plastic or a similar material that would be otherwise difficult for a drill bit. Hole saws cut circular holes in workpieces, resulting in plugs. Therefore, hole saws can cut larger holes that would otherwise be difficult for a drill bit. A hole saw is sometimes used to cut a hole in drywall where damage has occurred. After the hole is cut, a separate preformed plug similar in diameter to the hole saw may be inserted into the hole and plastered over in order to repair the drywall.

SUMMARY

The present invention provides, in one aspect, a repair kit for repairing a damaged area of a workpiece. The repair kit includes an arbor having an abutment surface, and a cutting member removably coupled to the arbor. The cutting member includes a side wall having a first end and a second end, an end cap coupled to the first end of the side wall and abutting the abutment surface of the arbor, a plurality of cutting elements coupled to the second end of the side wall, and a retention feature defined by the side wall. The cutting member is rotatable by the arbor to cut a hole in the workpiece. The retention feature is configured to engage the workpiece as the cutting member cuts the hole to secure the cutting member within the hole.

The present invention provides, in another aspect, a method for repairing a damaged area of a workpiece with a repair kit that includes an arbor and a cutting member removably coupled to the arbor. The arbor has an abutment surface. The cutting member has a side wall, an end cap coupled to a first end of the side wall and abutting the abutment surface of the arbor, and a plurality of cutting element coupled to a second end of the side wall. The method includes rotating the arbor to drive the cutting member about a central axis of the arbor, cutting a hole in the workpiece with the cutting member, and engaging the workpiece with the cutting member as the hole is cut to secure the cutting member within the hole. The method further includes disconnecting the arbor from the cutting member, and leaving the cutting member in the workpiece to plug the hole.

The present invention provides, in yet another aspect, a plug for plugging a hole in a workpiece. The plug includes a flat disc-shaped body having a plane and a central axis perpendicular to the plane, and a plurality of resilient members. Each of the resilient members is at least partially formed by a slot defined in the body that extends from an outer circumference of the body toward the central axis. The plug further includes a gripping tooth extending from each of the resilient members at the outer circumference of the body. Each of the resilient members is movable from an original position to a deflected position when a force is applied to allow the plug to be inserted into the hole. The resilient members return to the original position when the force is removed such that the gripping teeth engage the workpiece to secure the plug within the hole.

Other features and aspects of the invention will become apparent by consideration of the following detailed description and accompanying drawings.

BRIEF DESCRIPTION OF THE DRAWINGS

FIG. 3 is a perspective view of an arbor of the hole saw assembly of FIG. 1.

FIG. 4 is a perspective view of a cutting member of the hole saw assembly of FIG. 1.

FIG. 5 is a perspective view of the guide member of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
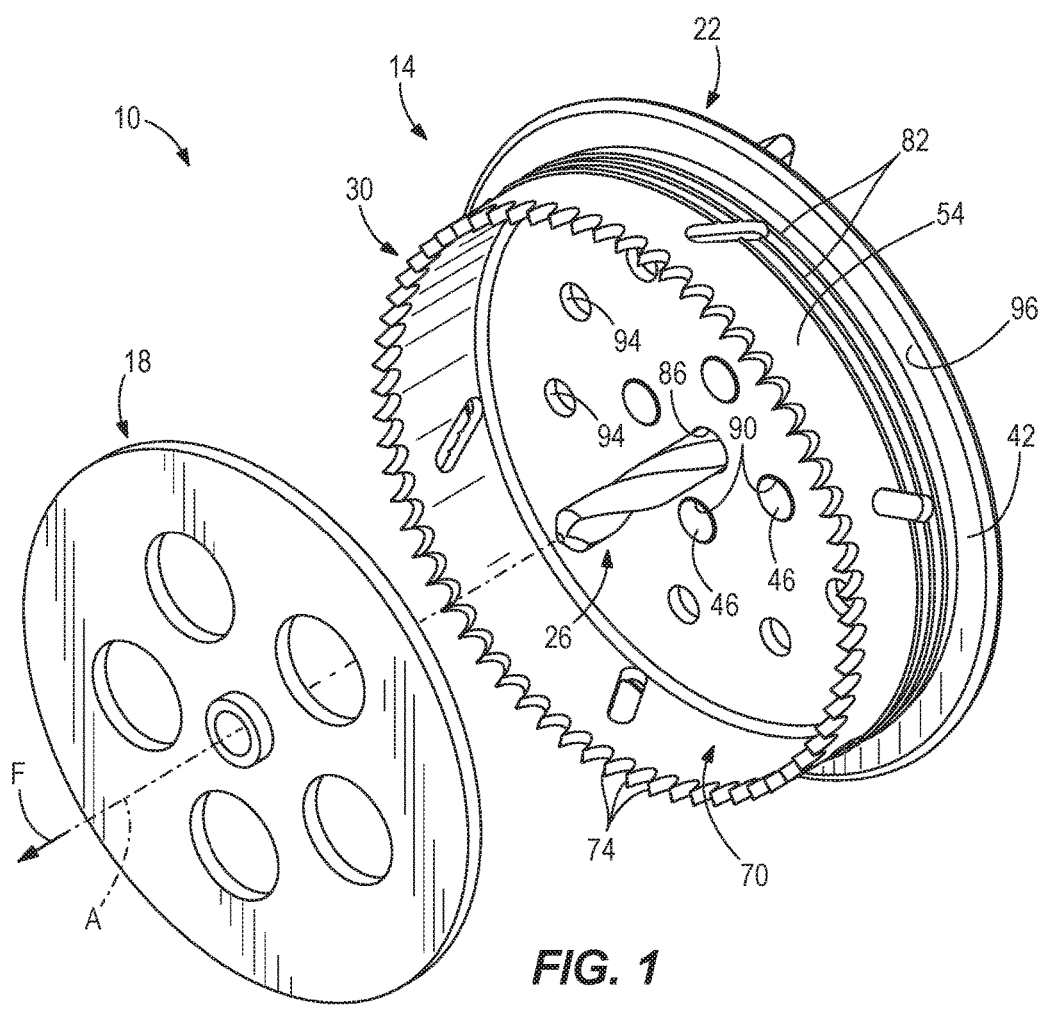
FIG. 1 is a perspective view of a drywall repair kit in accordance with an embodiment of the invention, the drywall repair kit including a hole saw assembly and a guide member.
Figure 2:
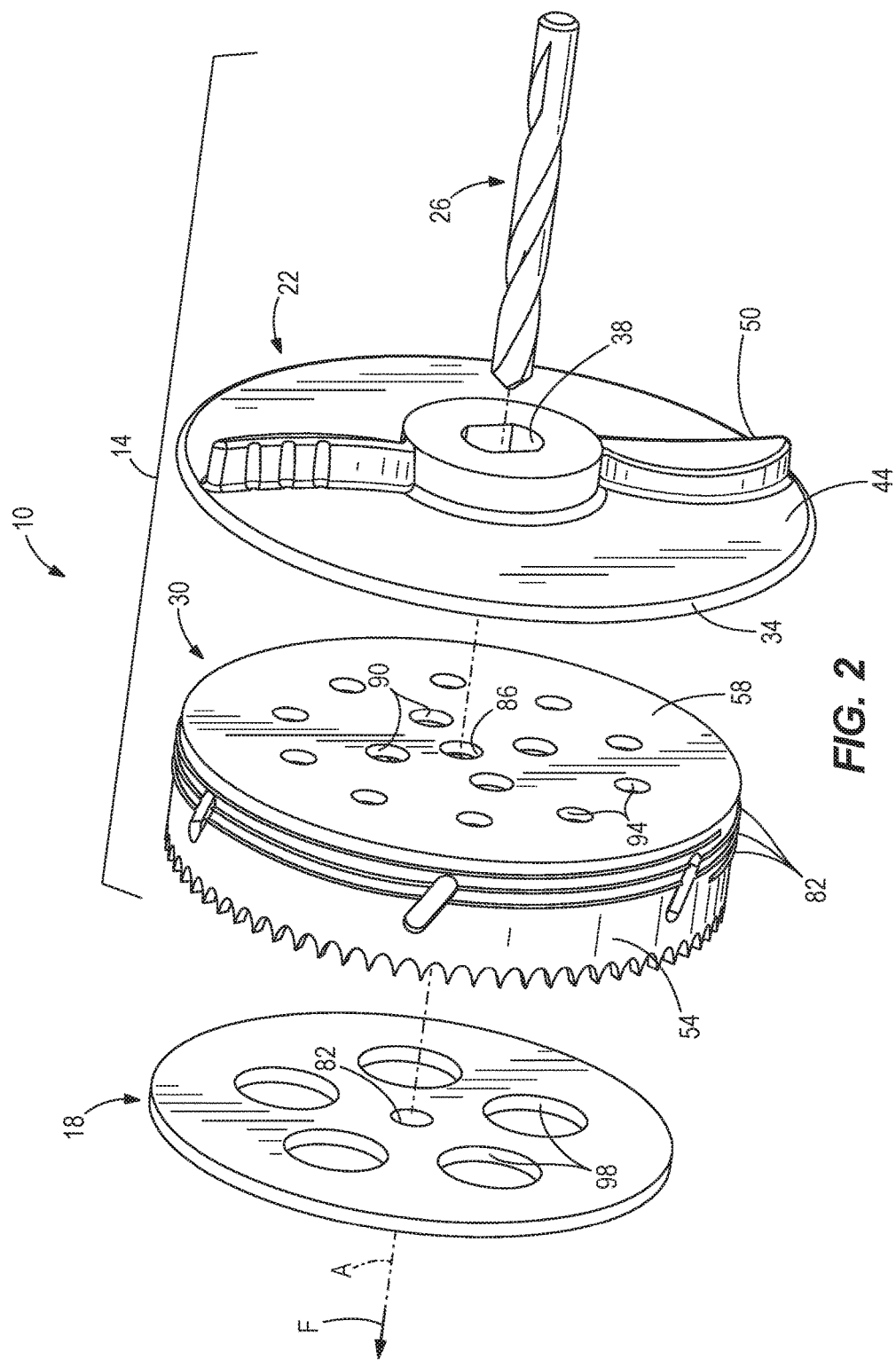
FIG. 2 is an exploded perspective of the drywall repair kit of FIG. 1.

FIGS. 1-2 illustrate a drywall repair kit 10 for repairing a punctured hole or damaged area of a workpiece (e.g., drywall). The illustrated kit 10 includes a cutting assembly or hole saw assembly 14 and a guide member 18. The assembly 14 includes an arbor 22, a pilot drill bit 26, and a cutting member 30. The arbor 22 and the pilot drill bit 26 are couplable to a drill (not shown) for rotation about an axis of rotation A. In some embodiments, the arbor 22 and the pilot drill bit 26 may be coupled to the drill via a chuck. The drill may be a power drill, a manually turned rotary hand drill or any similar tool capable of transferring rotational power to the arbor 22. The cutting member 30, or hole saw, is removably coupled to the arbor 22 and is driven by the arbor 22 to cut a circular hole out of the drywall around the damaged area. The cutting member 30 also acts as a plug and remains in the circular hole when the arbor 22 and the drill are disconnected.

With reference to FIGS. 2-3, the arbor 22 includes a back piece 34 having an abutment face 42. The arbor 22 also defines a bore 38 extending through the back piece 34. The bore 38 is concentric with the axis A. The arbor 22 has drive protrusions 46 that extend outwardly from the abutment face 42 parallel to the axis A. In the illustrated embodiment, there are four drive protrusions 46 that are equally spaced circumferentially around the bore 38 about the axis A. The pilot drill bit 26 is received within the bore 38 of the arbor 22 and extends outwardly from the abutment face 42 along the axis A. In alternate embodiments, the arbor 22 and the pilot drill bit 26 may be formed as one piece, and fewer or more drive protrusions 46 may be used.

The arbor 22 also includes a pair of projections 50 extending from a rear surface 44 of the back piece 34 opposite the abutment face 42. The projections 50 are configured to be manually grasped and turned about the axis A in the absence of a drill or other driving tools. In the illustrated embodiment, the projections 50 include two crescent-shaped projections extending radially outward from the bore 38. The projections 50 are circumferentially spaced apart 180 degrees about the axis A. In other embodiments, the arbor 22 may include other projection configurations that form grips for manually turning the hole saw assembly 14.

With reference to FIGS. 2 and 4, the cutting member 30 includes an annular side wall 54 and an end cap or back wall 58. The annular wall 54 extends from the back wall 58 at a first, proximal end 62 to a second, distal end 66. In some embodiments, the annular wall 54 tapers inwardly toward the axis A from the first, proximal end 62 to the second, distal end 66. The back wall 58 and the annular wall 54 define a cavity 70. The second end 66 of the annular wall 54 has a series of cutting teeth 74. The annular wall 54 also defines four slots 78 that are equally spaced circumferentially around the annular wall 54. The teeth 74 and the slots 78 are cutting elements that allow the cutting member 30 to function like a conventional hole saw.

The illustrated annular wall 54 also defines a retention feature 82. In the illustrated embodiment the retention feature 82 includes grooves or threads 82 extending circumferentially around the annular wall 54. The threads 82 are configured to engage the drywall as the cutting member 30 cuts into the drywall, thereby securing and retaining the cutting member 30 within the circular hole cut by the cutting member 30 so that the arbor 22 may be disconnected and removed. In the illustrated embodiment, the threads 82 are positioned closer to the first end 62 of the annular wall 54 than to the second end 66. In some embodiments, the threads 82 may be replaced with any projection extending outwardly from the annular wall 54 to engage the drywall and secure the cutting member 30 within the circular hole cut by the cutting member 30.

Figure 7:
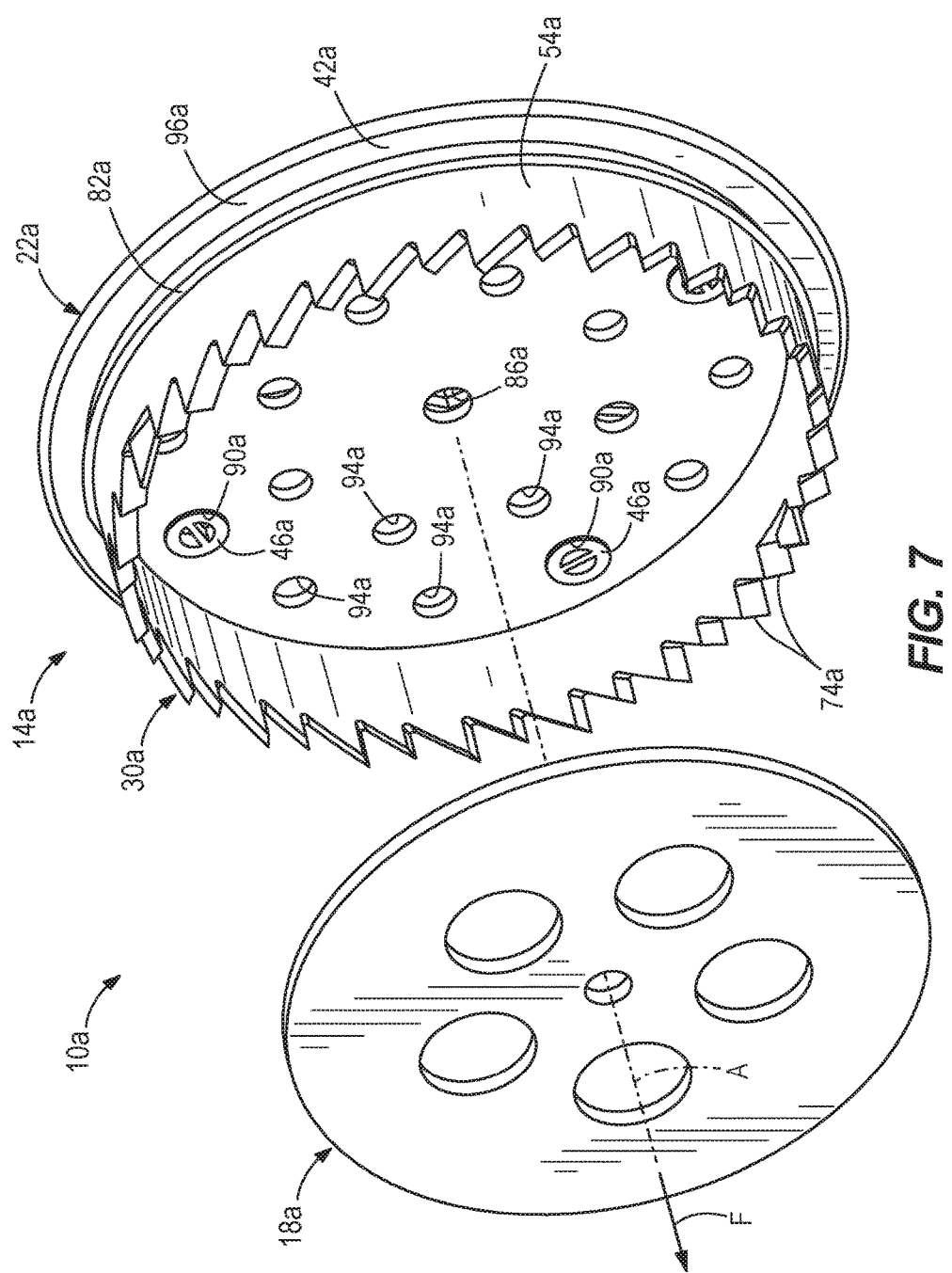
FIG. 7 is a perspective view of a drywall repair kit in accordance with another embodiment of the invention, the drywall repair kit including a hole saw assembly and a guide member.
Figure 8:
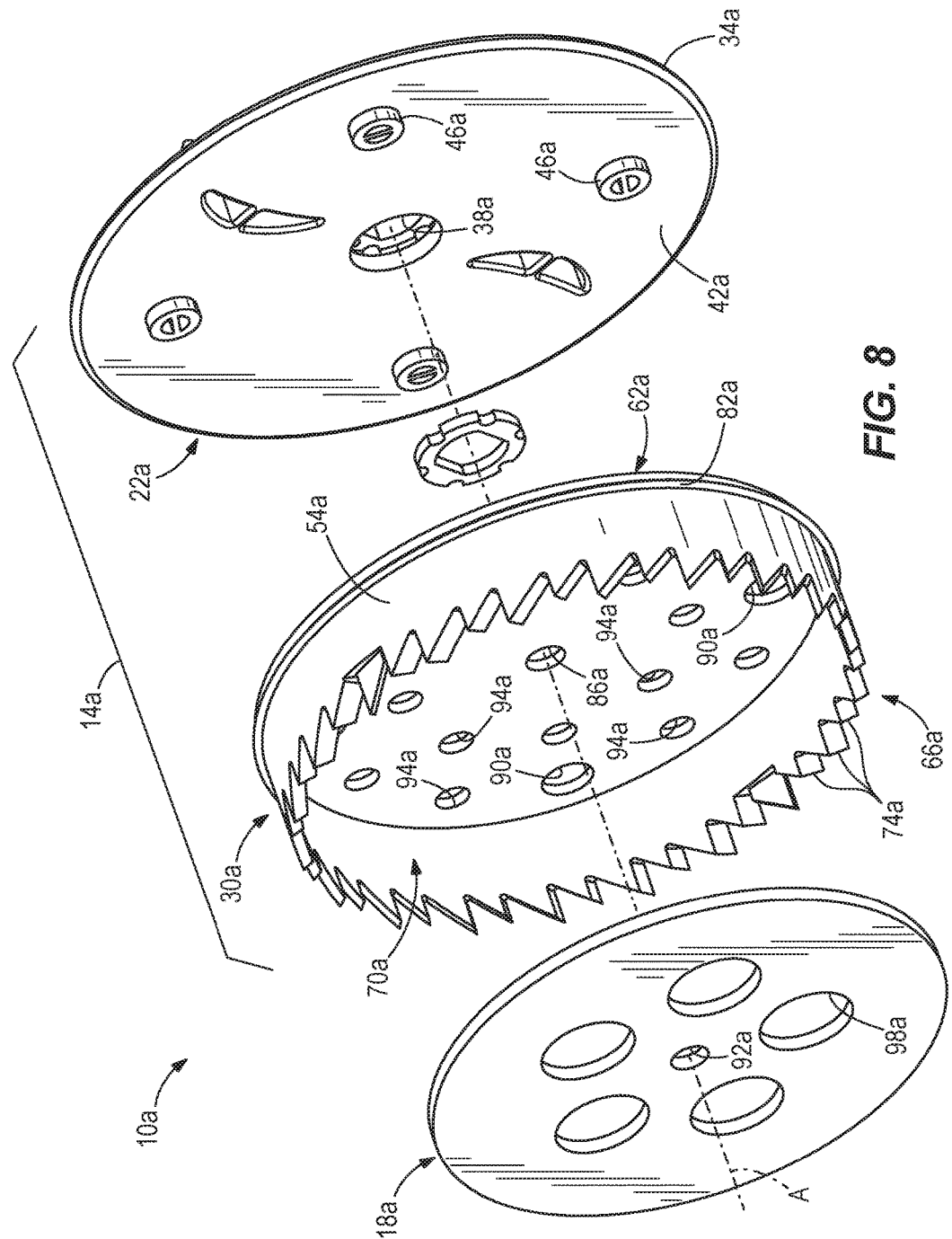
FIG. 8 is an exploded perspective view of the drywall repair kit of FIG. 7.
Figure 9:
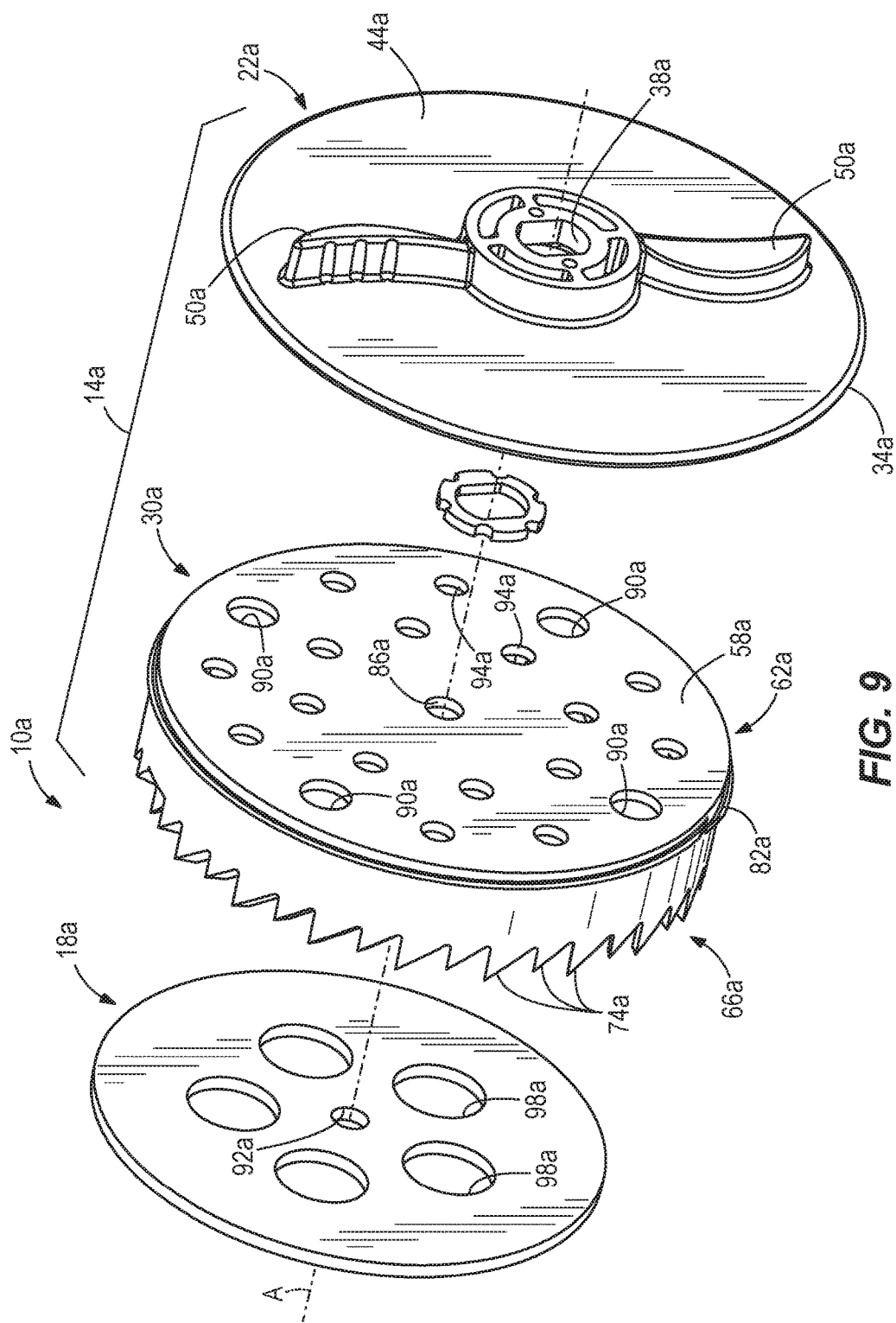
FIG. 9 is another exploded perspective view of the drywall repair kit of FIG. 7.

The back wall 58 defines a central aperture 86 sized to receive the pilot drill bit 26. The back wall 58 also defines drive apertures 90 equally spaced around the central aperture 86 and corresponding to the drive protrusions 46 of the arbor 22. The drive apertures 90 are configured to receive the drive protrusions 46 (as shown in FIG. 1). In alternate embodiments, the drive apertures 90 and the drive protrusions 46 may be spaced radially farther from the axis A (i.e., closer to the outer diameter of the back wall 58), as shown in FIGS. 7-9. In further alternate embodiments, the drive apertures 90 and the drive protrusions 46 may be arranged in any configuration or pattern. In further alternate embodiments, the drive apertures 90 may be blind recesses. In further alternate embodiments, the drive protrusions 46 may be located on the cutting member 30, and the drive apertures 90 may be located on the arbor 22. In addition, the illustrated back wall 58 defines through holes 94 spaced around the central aperture 86. The through holes 94 help retain a joint or surfacing compound (e.g., spackle), applied over the circular hole cut out of the drywall and on the back wall 58 of the cutting member 30.

As previously mentioned, the arbor 22 is coupled to a drill for rotation about the axis A, and the cutting member 30 is removably coupled to the arbor 22. As shown in FIGS. 1-2, the central aperture 86 and the drive apertures 90 of the cutting member 30 receive the drill bit 26 and the drive protrusions 46 of the arbor 22 so that the cutting member 30 is coaxial with the axis A of the arbor 22. Additionally, the back wall 58 of the cutting member 30 abuts the abutment face 42 of the back piece 34. The back piece 34 extends radially outward past the annular wall 54 of the cutting member 30, such that the abutment face 42 of creates an annular flange or lip 96 (FIG. 1) that inhibits the cutting member 30 from being driven too deep into the drywall while cutting. The drive protrusions 46 engage the drive apertures 90 of the cutting member 30 as the arbor 22 is rotated by the drill, thus driving the cutting member 30 about the axis A. The cutting member 30 is held in engagement with the drive protrusions 46 as force is applied along the axis A in a direction of arrow F (FIG. 1) (e.g., toward the drywall) to drive the cutting member 30 deeper into the drywall until cutting is complete. However, the cutting member 30 may be removed from the arbor 22 by axially sliding the drive protrusions 46 out of the drive apertures 90 and the cutting member 30 off the drill bit 26 in a direction opposite the direction F (e.g., away from the drywall).

With reference to FIGS. 2 and 5, the guide member 18 is formed as a circular disc with a central projection 88 that extends axially outwardly. The guide member 18 defines a central aperture 92 extending through the projection 88. The central aperture 92 of the guide member 18 is sized to provide clearance for the pilot drill bit 26. In the illustrated embodiment, the central aperture 92 is approximately equal in size to the central aperture 86 of the cutting member 30, but may be any size that allows the drill bit 26 to pass therethrough. The guide member 18 has an outer diameter that is similar to, but no greater than, an inner diameter of the annular wall 54 of the cutting member 30, such that the guide member 18 fits within the cavity 70 of the cutting member 30. The guide member 18 is configured to be coupled to the drywall, by pressing the projection 88 into the drywall, to cover a damaged area. In alternate embodiments, the guide member 18 may include teeth, pins, gripping members, adhesive or the like to secure the guide member 18 to the drywall. In further alternate embodiments, the guide member 18 may include holes configured to receive screws to couple the guide member 18 to the drywall. The guide member 18 further defines a plurality of large holes 98 equally spaced around the central aperture 86. The large holes 98 reduce the weight and material of the guide member 18. The holes 98 may also be used to view the damaged area through the guide member 18 as the guide member 18 is coupled to the drywall to make sure the damaged area is properly covered.

In operation of the drywall repair kit 10, when the cutting member 30 is coupled to the arbor 22, the drill bit 26 is inserted through the central aperture 92 of the guide member 18 to center the cutting member 30 on the guide member 18 about the axis A. The cutting member 30 is then rotated about the axis A until the drive apertures 90 align to receive the drive protrusions 46. Once aligned, the drill may be powered to rotate the cutting member 30 about the axis A and begin cutting the hole in the drywall. The guide member 18 fits within the cavity 70 to guide and align the cutting member 30 and keep the cutting member 30 straight. Applying force axially along the axis A drives the cutting member 30 deeper into the drywall until the annular flange 96 formed by the back piece 34 abuts the drywall, thereby inhibiting further movement of the assembly 14 into the drywall. As the assembly 14 cuts into the drywall, the threads 82 of the cutting member 30 engage the drywall to secure the cutting member 30 within the circular hole in the drywall. Once the cutting member 30 is secured in the circular hole, the drill bit 26 and the drive protrusions 46 are axially withdrawn from the central aperture 86 of the cutting member 30 and the drive apertures 90, leaving the cutting member 30 within the circular hole as a plug.

Figure 6:
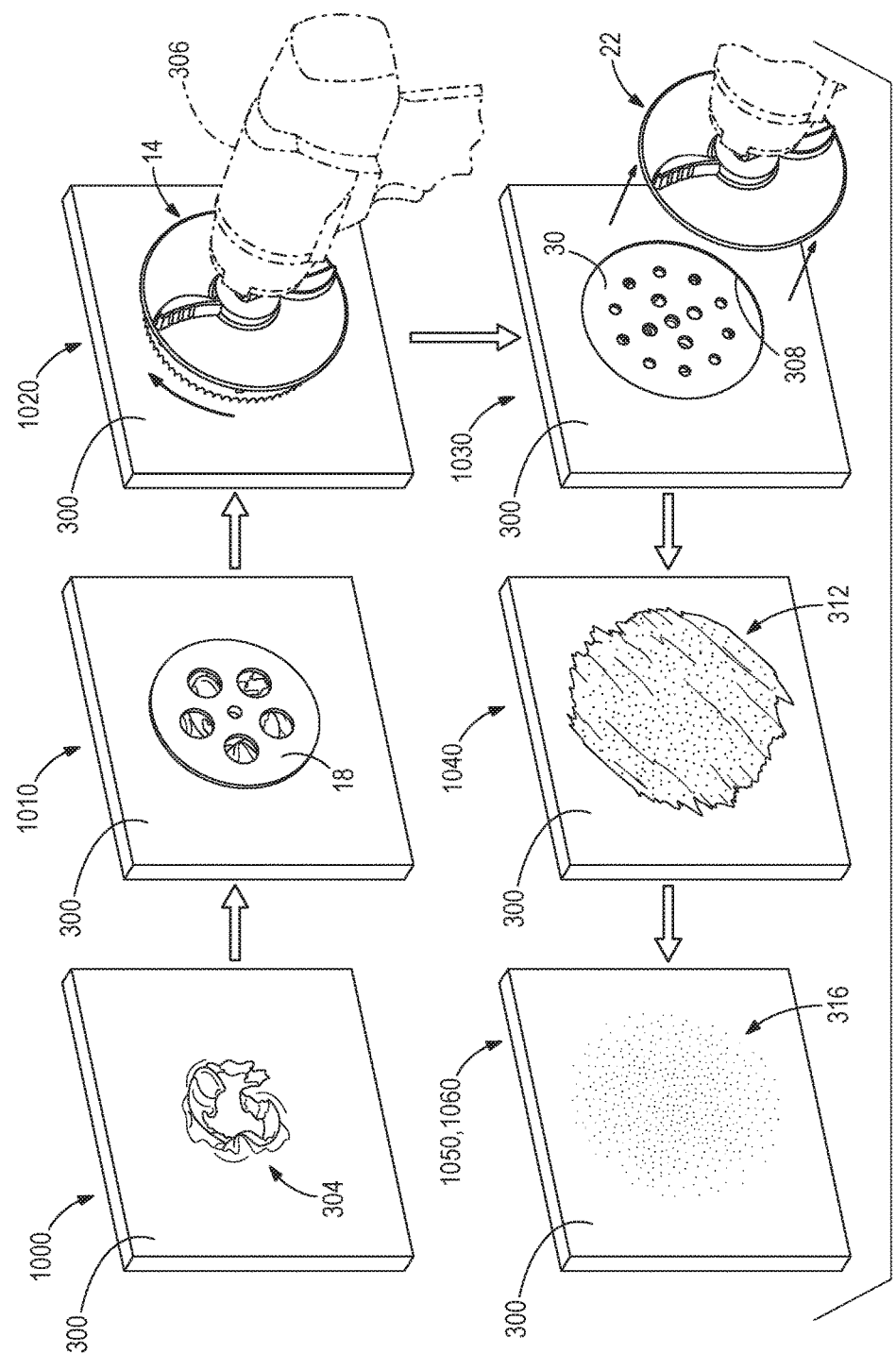
FIG. 6 illustrates a method of repairing a damaged portion of drywall using the drywall repair kit of FIG. 1.

FIG. 6 illustrates a method for repairing a damaged area 304 (e.g., a hole) in drywall 300 using the drywall repair kit 10 of FIGS. 1-5. In step 1000, the damaged area 304 is observed in the drywall 300. In step 1010, the guide member 18 is applied to the drywall 300 to cover the damaged area 304. The guide member 18 is coupled to the drywall 300 by pressing the projection 88 into the drywall 300. The guide member 18 may be centered on the damaged area 304 or may be slightly offset relative to the damaged area 304, depending on the location of studs or other environmental considerations.

In step 1020, the arbor 22 and the cutting member 30 are coupled to a drill 306. The drill bit 26 is aligned in the central aperture 92 of the guide member 18. The drill 306 is then powered so that the cutting member 30 cuts a circular cut hole 308 in the drywall 300 around the guide member 18. As the cutting member 30 cuts into the drywall 300, the threads 82 of the cutting member 30 engage the drywall 300 to secure the cutting member 30 within the hole 308.

In step 1030, the drill 306 and the arbor 22 are axially withdrawn and removed from the cutting member 30, leaving the hole 308 plugged by the cutting member 30.

In step 1040, the hole 308 and the cutting member 30 are spackled over. The spackle 312 is left to dry. In step 1050, once the spackle 312 has dried, the spackle 312 is sanded flush with a surface of the drywall 300. In step 1060, paint (or other coatings) is applied over the sanded area of spackle 316 that is covering the cutting member 30 and the hole 308. Depending on the type of workpiece being repaired, one or more of the steps 1040, 1050, 1060 may be omitted. For example, it may not be necessary to spackle and sand a non-drywall workpiece that is being repaired with the kit 10.

The cutting member 30 can have different diameters to allow for repair of larger or smaller damaged areas. For example, in some embodiments, the cutting member 30 may have a diameter of 2.5 inches, and in some embodiments the cutting member 30 may have a diameter of 4 inches, allowing for the repair of damaged areas that have a max width of 2.5 inches or 4 inches, respectively. However, the cutting member 30 may also be of any diameter between 2.5 inches and 4 inches, any diameter smaller than 2.5 inches, or any diameter larger than 4 inches. The other components of the drywall repair kit 10, such as the arbor 22 and the guide member 18, may be sized accordingly.

FIGS. 7-9 illustrate another drywall repair kit 10a. With the exception of some minor distinctions, the drywall repair kit 10a of FIGS. 7-9 is substantially similar to the drywall repair kit 10 of FIGS. 1-5. Like components and features are identified with like reference numerals plus the letter "a" and will not be described again in detail. The manner of operation of the drywall repair kit 10a of FIGS. 7-9 is identical to that described above in connection with the drywall repair kit 10 of FIGS. 1-5. In addition, the method for repairing a damaged area (e.g., a hole) in drywall using the drywall repair kit 10a of FIGS. 7-9 is identical to the method for repairing a damaged area using the drywall repair kit 10 of FIGS. 1-5, as shown in FIG. 6. Therefore, only differences between the two embodiments will be described in detail.

With reference to FIGS. 7-9, the cutting member 30a includes a single thread 82a that extends circumferentially around the annular wall 54a of the cutting member 30a. Similar to the threads 82 of the cutting member 30 of FIGS. 1, 2, and 4, the thread 82a engages the drywall as the cutting member 30a cuts into the drywall, thereby retaining the cutting member 30a within the circular hole cut by the cutting member 30a once the arbor is removed. The single thread 82a on the cutting member reduces the possibility of the cutting member 30a grinding into the drywall compared to a cutting member with multiple threads.

With continued reference to FIGS. 7-9, the drive apertures 90a of the cutting member 30a are spaced farther away radially from the axis A, nearer the annular wall 54a. The corresponding drive protrusions 46a of the arbor 22a are also spaced farther away radially from the axis A. Additionally, although not shown, the drywall repair kit 10a of FIGS. 7-9 may include a pilot drill bit similar to the pilot drill bit 26 of FIGS. 1 and 5.

Figure 11:
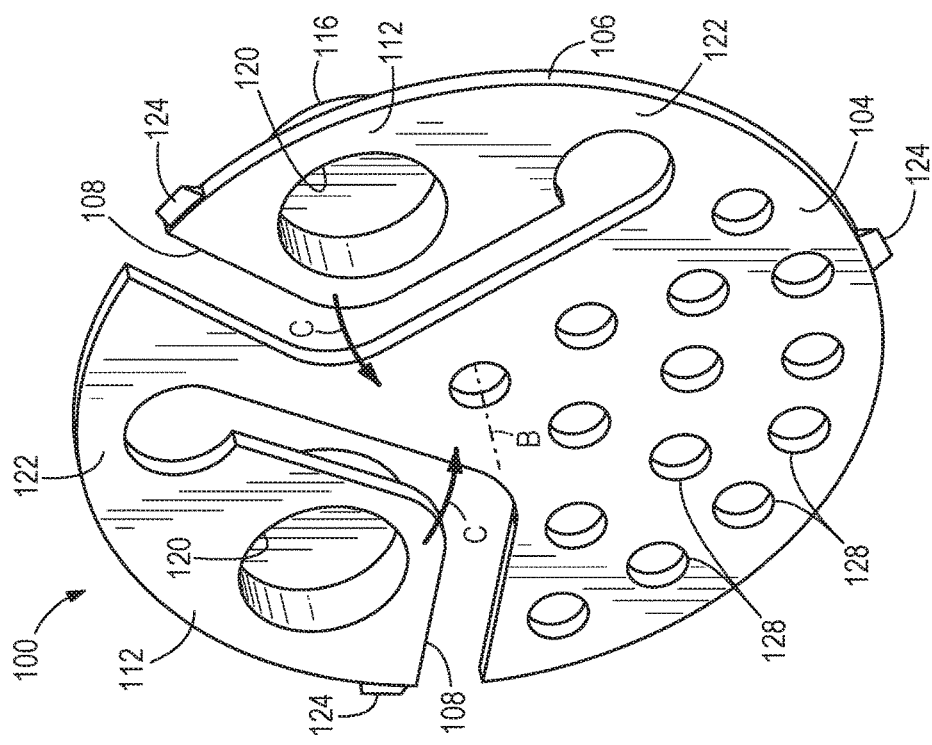
FIG. 11 is another perspective view of the auxiliary plug of FIG. 10.
Figure 10:
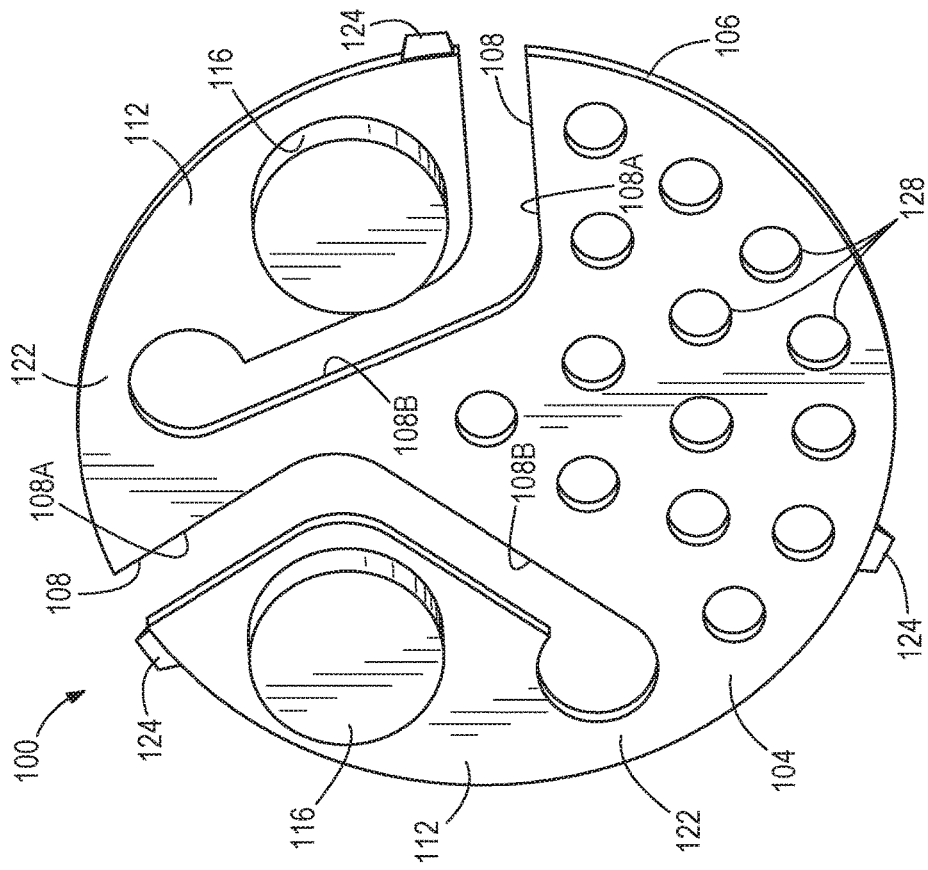
FIG. 10 is a perspective view of an auxiliary plug.

FIGS. 10-11 illustrate an auxiliary plug 100 that may be included in the drywall repair kit 10 of FIGS. 1-5 and used to plug holes cut in the drywall by the cutting member 30 or a similarly sized hole saw. The auxiliary plug 100 is typically used when an obstruction (e.g., a stud) inhibits the cutting member 30 from being fully inserted into the hole, and thus, flush with the surface of the drywall. The auxiliary plug 100, may be part of the drywall repair kit 10 or an independent component that is used separately or in combination with other hole saws or drywall repair kits. Although described with reference to, and as part of, the drywall repair kit 10 of FIGS. 1-5, the auxiliary plug 100 may also be included in, or used with, the drywall repair kit 10a of FIGS. 7-9.

The auxiliary plug 100 includes a generally flat disc shaped body 104 having a central axis B. The body 104 defines a pair of slots 108 that each extend from an outer circumference 106 of the body 104 to form a pair of flexible resilient members 112 on the body 104. In the illustrated embodiment, the slots 108 are generally L-shaped, but may alternatively have other shapes or configurations. Specifically, each of the illustrated slots 108 has a first portion 108A that extends from the outer circumference 106 generally towards the center of auxiliary plug 100, and a second portion 108B that extends from an end of the first portion 108A towards the outer circumference 106 to form an "L" shape. Each of the resilient members 112 has a flexible portion 122 between an end of the second portion 108B of the slot 108 and the outer circumference 106. The flexible portions 122 connect each of the resilient members 112 to the rest of the body 104. The resilient members 112 and the pair of slots 108 are configured with the flexible portion 122 to allow the resilient members 112 to flex radially inwards.

In the illustrated embodiment, the resilient members 112 each have a cylindrical projection 116 axially extending from the body 104. The cylindrical projections 116 each have a recess 120 for receiving, for example, a thumb and a finger of a user, respectively, for squeezing the resilient members 112 radially inward. In particular, a user can insert his/her thumb and finger into the recesses 120 and then squeeze his/her thumb and finger together. This action causes the resilient members 112 to flex or bend about the flexible portions 122 radially inwards toward the center of the body 104 (e.g., in the direction of arrows C in FIG. 11). As the resilient members 112 move toward the center, the members 112 collapse the slots 108 and reduce the outer diameter of the body 104.

The illustrated auxiliary plug 100 further includes three gripping teeth 124 extending from the outer circumference 106 of the auxiliary plug 100. In the illustrated embodiment, the gripping teeth 124 are evenly circumferentially spaced around the outer circumference 106 (e.g., about 120 degrees apart about the central axis of the body 104). Each of the resilient members 112 includes at least one of the gripping teeth 124 adjacent the corresponding slot 108 on the outer circumference 106. Another one of the gripping teeth 124 is located on the outer circumference 106 equidistant from the gripping teeth 124 on the resilient members 112. In addition, similar to the cutting member 30, the illustrated body 104 defines through holes 128. The through holes 128 help to retain spackle applied over the circular hole cut out of the drywall and the body 104 of the auxiliary plug 100.

The auxiliary plug 100 may have different diameters to allow for repair of larger or smaller damaged areas. The diameters may correspond to the diameter of the cutting member 30 or another hole saw. The diameter may be the same as the cutting member 30 or slightly larger to provide for a tight fit within the hole in the drywall cut out by the cutting member 30. For example, the auxiliary plug 100 may have a diameter of about 2.5 inches or about 4 inches, allowing for the repair of damaged areas that have a max width of 2.5 inches or 4 inches, respectively. However, the auxiliary plug 100 may also be of any diameter between 2.5 inches and 4 inches, or of any diameter smaller than 2.5 inches or larger than 4 inches.

In operation, the auxiliary plug 100 is typically used when the cutting member 30 cannot fully be received within the hole cut in the drywall due to an obstruction such that the back wall 58 of the cutting member 30 is not flush with the surface of the drywall. The obstruction is typically a material that is too hard to be cut by the cutting member 30 (e.g., a wooden or metal stud), but in some instances the obstruction may be undesirable to cut for structural or aesthetic reasons. Once the hole has been cut in the drywall, the cutting member 30 is removed from the hole along with the guide member 18. If the threads 82 of the cutting member 30 are engaged with the drywall, the cutting member 30 is removed by rotating the cutting member 30 in a direction opposite the cutting direction to disengage the threads 82.

After the cutting member 30 is removed, a user selects an auxiliary plug 100 of appropriate size for the hole. The user then inserts a thumb and a finger into a corresponding one of the recesses 120 of the resilient members 112 of the auxiliary plug 100. The resilient members 112 are squeezed together such that the resilient members 112 deflect inwardly towards one another to reduce the diameter of the auxiliary plug 100. The diameter of the auxiliary plug 100 is reduced in order to fit within the hole. This is due to the diameter of the auxiliary plug 100 being approximately the same as, or slightly larger than, the diameter of the cutting member 30. The auxiliary plug 100 is then inserted into the hole in the drywall. The resilient members 112 are then released, allowing the flexible portions 122 to spring back, such that the resilient members 112 move towards their original position. As the resilient members 112 deflect radially outward, the outer circumference 106 and the gripping teeth 124 engage the hole in the drywall to secure the auxiliary plug 100 within the hole.

The method of using the drywall repair kit 10 shown in FIG. 6 is similar to a method that includes and uses the auxiliary plug 100. Therefore, only the differences between the methods will be explained in detail. Step 1000, step 1010, and step 1020 remain the same as the method described above in which the auxiliary plug 100 is not used. Step 1030 is also similar; however, the hole saw 30 and the guide member 18 are removed once the hole 308 is made in the drywall 300. In an additional step, between step 1030 and step 1040, the auxiliary plug 100 is inserted into the hole 308 as described in detail above. Once the auxiliary plug 100 is secured within the hole 308, the auxiliary plug 100 and the hole 308 are spackled over and left to dry, similar to step 1040 in which the cutting member 30 remains in the hole 308. Step 1050 and step 1060 remain the same, in which the spackle 312 is sanded flush with the surface of the drywall 300 before applying paint.

Figure 12:
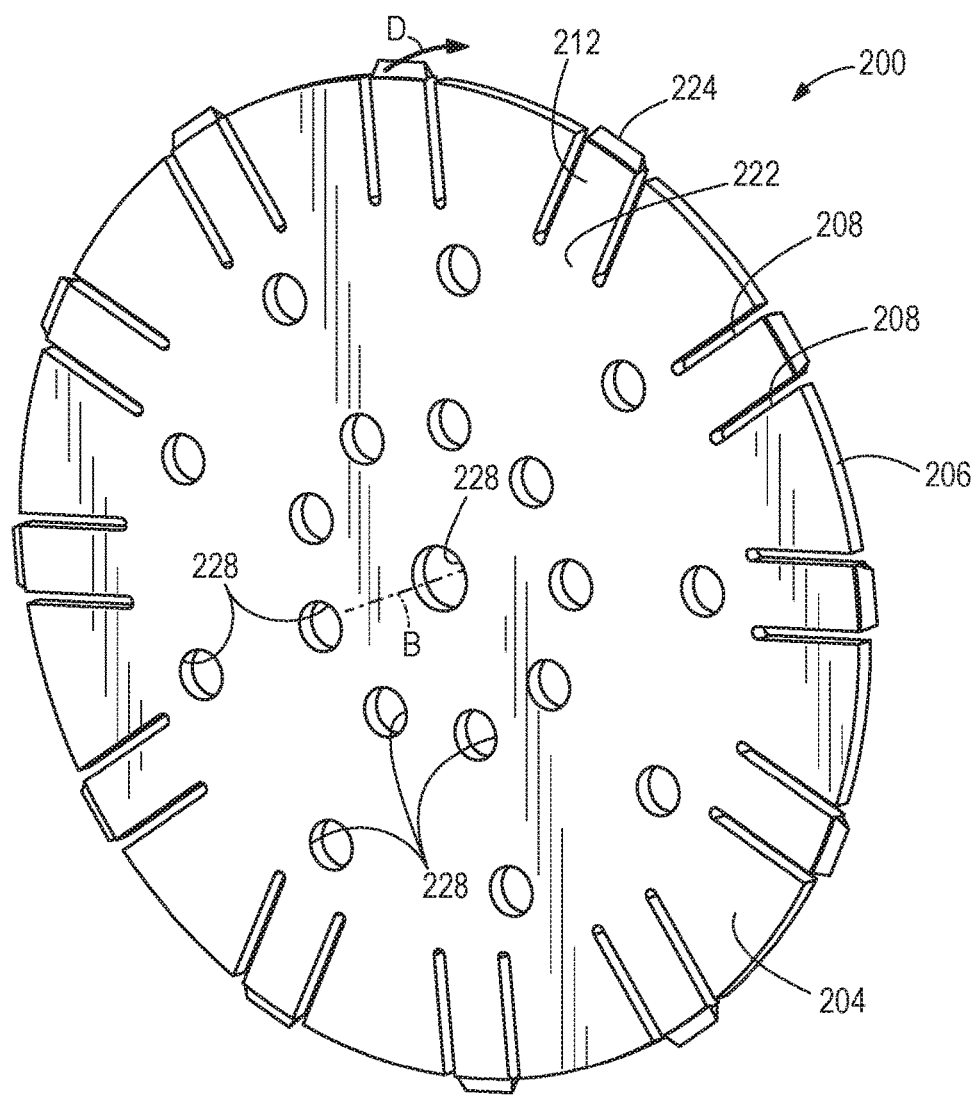
FIG. 12 is a perspective view of an auxiliary plug in accordance with another embodiment of the invention.

FIG. 12 illustrates another auxiliary plug that may be included in the drywall repair kit 10 of FIGS. 1-5 and used to plug holes cut in the drywall by the cutting member 30 or a similarly sized hole saw. The auxiliary plug 200 is typically used when an obstruction (e.g., a stud) inhibits the cutting member 30 from being fully inserted into the hole and flush with the surface of the drywall. The auxiliary plug 200 may be part of the drywall repair kit 10 or an independent component that is used separately or in combination with other hole saws or drywall repair kits. Although described with reference to, and as part of, the drywall repair kit 10 of FIGS. 1-5, the auxiliary plug 100 may also be included in, or used with, the drywall repair kit 10a of FIGS. 7-9.

With reference to FIG. 12, the auxiliary plug 200 includes a generally flat disc-shaped body 204 having a plane and a central axis B perpendicular to the plane in a center of the body 204. The body 204 has an outer circumference 206. The auxiliary plug 200 further includes flexible resilient members 212 circumferentially spaced evenly about the center axis (e.g., about 30 degrees apart about the central axis of the body 204). In the illustrated embodiment, the plug 200 includes twelve flexible resilient members 212, but may alternatively include fewer or more flexible members 12. Each of the resilient members 212 is defined in the body 204 by a pair of slots 208 that extend from the outer circumference 206 of the body 204 generally towards the center of the body 204. Each of the resilient members 212 is connected to the body 204 by a flexible portion 222. The resilient members 212 are configured with the flexible portions 222 to allow the resilient members 212 to flex out of the plane with the remainder of the body 204. Specifically, as a force is applied to each of the resilient members 212, the resilient member 212 deflects to a deflected position in which the resilient member 212 is deformed out of the plane of the body 204 generally towards the central axis B (e.g., in the direction of arrow D in FIG. 9). When the force is removed, the resilient member 212 springs back to the original position, in which the resilient member 212 lies in the plane of the body 204.

In the illustrated embodiment, each of the resilient members 212 has a gripping tooth 224. Each gripping tooth 224 extends radially outward at a distal end of each of the resilient members 212 so as to protrude from the outer circumference 206 of the body 204. In addition, similar to the auxiliary plug 100 of FIGS. 10-11, the illustrated body 204 defines through holes 228. The through holes 228 help to retain spackle applied over the circular hole cut out of the drywall and the body 204 of the auxiliary plug 200.

Similar to the auxiliary plug 100 of FIGS. 10-11, the auxiliary plug 200 of FIG. 12 may have different diameters to allow for repair of larger or smaller damaged areas. The diameters may correspond to the diameter of the cutting member 30 or another hole saw. The diameter may be the same as the cutting member 30 or slightly larger to provide for a tight fit within the hole in the drywall cut out by the cutting member 30. For example, the auxiliary plug 200 may have a diameter of about 2.5 inches or about 4 inches, allowing for the repair of damaged areas that have a max width of 2.5 inches or 4 inches, respectively. However, the auxiliary plug 200 may also be of any diameter between 2.5 inches and 4 inches, or of any diameter smaller than 2.5 inches or larger than 4 inches.

In operation, similar to the auxiliary plug 100 of FIGS. 10-11, the auxiliary plug 200 is used when the cutting member 30 is unable to act as a plug, for example, when the cutting member 30 cannot be fully received within the hole cut in the drywall. Once the cutting member 30 is removed from the hole, a user selects an auxiliary plug 200 of appropriate size for the hole. The auxiliary plug 200 is then aligned with the hole and inserted into the hole in the drywall by pushing on the auxiliary plug 200, thereby applying an axial force generally along the central axis. As the body 204 of the auxiliary plug 200 is inserted into the hole, the teeth 224 extending from each of the resilient members 212 engage the drywall around the edge of the hole causing the resilient members 212 to flex and deflect away from the body 204 to allow the auxiliary plug 200 to be inserted into the hole. Once the auxiliary plug 200 is fully inserted into the hole, the resilient members 212 spring back to their original position, such that the resilient members 212 lie in the plane of the body 204 and the teeth 224 of the resilient members 212 engage the drywall to secure the auxiliary plug 200 within the hole.

The method of repairing a damaged area (e.g., a hole) in drywall using the drywall repair kit 10, 10*a* in combination with the auxiliary plug 200 of FIG. 12 is identical to the method for repairing a damaged area using the drywall repair kit 10, 10*a* with the auxiliary plug 100 of FIGS. 10-11, as described above. One simply uses the auxiliary plug 200 of FIG. 12 in place of the auxiliary plug 100 of FIGS. 10-11.

Additionally, each of the components of the drywall repair kit 10 of FIGS. 1-5, the drywall repair kit 10*a* of FIGS. 7-9, and the auxiliary plugs 100, 200 of FIGS. 10-12 may be formed out of plastic, composites, metal or any other suitable material for cutting drywall. It should be noted that the individual components may be formed out of different materials. For example, the cutting member 30 may be formed out of metal, while the auxiliary plugs 100, 200 may be formed out of plastic. Additionally, although, the present application specifically refers to repairing drywall, it should be readily apparent that the kits 10, 10*a* may also be used to repair other types of workpieces, such as wood, composite material or the like.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A method for repairing a damaged area of a workpiece with a repair kit including an arbor and a cutting member removably coupled to the arbor, the arbor having an abutment surface, the cutting member having a side wall, an end cap coupled to a first end of the side wall and abutting the abutment surface of the arbor, and a plurality of cutting elements coupled to a second end of the side wall, the method comprising:
    rotating the arbor to drive the cutting member about a central axis of the arbor;
    cutting a hole in the workpiece with the cutting member;
    engaging the workpiece with the cutting member as the hole is cut to secure the cutting member within the hole;
    disconnecting the arbor from the cutting member; and
    leaving the cutting member in the workpiece to plug the hole.

2. The method of claim 1, wherein the abutment surface of the arbor extends radially beyond the end cap of the cutting member to form a lip, and wherein cutting the hole includes driving the cutting member axially into the workpiece until the lip engages the workpiece.

3. The method of claim 1, wherein the cutting member defines a plurality of drive apertures in the end cap, wherein the arbor includes a plurality of drive protrusions extending from the abutment surface, wherein rotating the arbor to drive the cutting member includes receiving the plurality of drive protrusions in the plurality of drive apertures, and wherein disconnecting the arbor from the cutting member includes withdrawing the plurality of drive protrusions from the plurality of drive apertures.

4. The method of claim 1, wherein the cutting member includes a thread extending circumferentially around the side wall, and wherein engaging the workpiece with the cutting member includes engaging with the workpiece with the thread as the cutting member cuts the hole.

5. The method of claim 4, wherein the thread is positioned closer to the first end of the side wall than to the second end of the side wall so that an area of the side wall adjacent to the second end does not include the thread.

6. The method of claim 1, wherein the arbor includes a grip extending from a surface of the arbor opposite the abutment surface, and wherein rotating the arbor includes engaging the grip to manually turn the arbor.

7. The method of claim 1, further comprising coupling the arbor and the cutting member to a drill, and wherein rotating the arbor includes rotating the arbor with the drill.

8. The method of claim 1, wherein the repair kit includes a pilot drill bit coupled to the arbor and extending through a central aperture of the end cap, wherein cutting the hole in the workpiece includes engaging the workpiece with the pilot drill bit, and wherein disconnecting the arbor from the cutting member includes removing the pilot drill bit from the central aperture of the end cap.

9. The method of claim 1, further comprising:
    applying spackle over the hole and the cutting member to create a spackled area;
    sanding the spackled area to be flush with an adjacent surface of the workpiece; and
    applying a coating to the spackled area of the workpiece.

10. The method of claim 1, further comprising:
    selecting a guide member sized to sufficiently cover the damaged area of the workpiece;
    positioning the guide member over the damaged area; and
    guiding the cutting member to cut the hole at the damaged area of the workpiece using the guide member.

11. The method of claim 10, wherein guiding the cutting member includes receiving the guide member within a cavity defined by the side wall of the cutting member.

12. The method of claim 10, wherein the guide member includes a central projection that extends axially away from the end cap of the cutting member, and wherein positioning the guide member over the damaged area includes pressing the central projection into the workpiece.

13. The method of claim 12, wherein the repair kit includes a pilot drill bit coupled to the arbor and extending through the end cap of the cutting member, and wherein guiding the cutting member includes inserting the pilot drill bit through an aperture of the central projection of the guide member.

14. A method for repairing a damaged area of a workpiece with a repair kit including an arbor, a cutting member removably coupled to the arbor, and a guide member, the arbor having an abutment surface, the cutting member having a side wall, an end cap coupled to a first end of the side wall and abutting the abutment surface of the arbor, and a plurality of cutting elements coupled to a second end of the side wall, the method comprising:
   coupling a drill to the arbor;
   positioning the guide member over the damaged area of the workpiece;
   rotating the arbor with the drill to drive the cutting member about a central axis of the arbor;
   cutting a hole in the workpiece with the cutting member as the arbor is rotated by the drill;
   engaging the workpiece with the cutting member as the hole is cut to secure the cutting member within the hole, the cutting member including a thread extending circumferentially around the side wall to secure the cutting member within the hole;
   disconnecting the arbor from the cutting member; and
   leaving the cutting member in the workpiece to plug the hole.

15. The method of claim 14, further comprising receiving the guide member within a cavity defined by the side wall of the cutting member to guide the cutting member to cut the hole at the damaged area of the workpiece.

16. The method of claim 14, further comprising:
   applying spackle over the hole and the cutting member to create a spackled area;
   sanding the spackled area to be flush with an adjacent surface of the workpiece; and
   applying a coating to the spackled area of the workpiece.

* * * * *